United States Patent Office 3,041,156
Patented June 26, 1962

3,041,156
PHENOLIC RESIN BONDED GRINDING WHEELS
Robert A. Rowse, Shrewsbury, and Carleton P. Stinchfield, Worcester, Mass., assignors to Norton Company, Worcester, Mass., a corporation of Massachusetts
No Drawing. Filed July 22, 1959, Ser. No. 828,718
8 Claims. (Cl. 51—298)

The invention relates to grinding wheels and other abrasive products bonded with phenolic resin.

One object of the invention is to provide phenolic resin bonded grinding wheels of greater strength. Another object of the invention is to provide phenolic resin bonded grinding wheels of greater strength when subjected to moisture. Another object of the invention is to provide organic bonded grinding wheels which are more durable, having slower rate of wear in grinding and at the same time maintaining their good cutting action.

Another object of the invention is to provide phenolic resin bonded grinding wheels which are resistant to deterioration by water. Another object of the invention is to provide phenolic resin bonded grinding wheels which are resistant to deterioration by coolants and grinding fluids.

Another object of the invention is to provide phenolic resin bonded grinding wheels which are more stable and less affected by changes in atmospheric conditions. Another object of the invention is to provide phenolic resin bonded grinding wheels which are resistant to deterioration by water, coolants, and other grinding fluids thereby providing phenolic resin wheels whose performance will remain unchanged throughout the useful life of the wheel.

Another object is to provide wheels capable of being operated with greater safety against breakage, particularly in the wet condition. Another object is to provide wheels which are operable at higher speeds giving faster rates of stock removal with equal or better safety, particularly in the wet condition.

Another object is to obtain greater strength of adhesion between phenolic resin and abrasive grains in abrasive products particularly in the wet condition. Another object is to provide phenolic resin bonded grinding wheels which perform uniformly from one wheel to another and from one batch of wheels to another batch of wheels.

Other objects will be in part obvious or in part pointed out hereinafter.

In accordance with the invention, we coat abrasive with silane or hydrolyzed silane so as to deposit a uniform coating on the surface of all grains and then allow the silane or hydrolyzed silane to further react to form siloxanes. We then make grinding wheels and other bonded abrasive products therefrom using phenolic resin bonding material. Such wheels show far greater resistance to deterioration by water than do phenolic resin bonded grinding wheels heretofore known. In this invention the silane is defined as

where R is amine, epoxy, phenolate, hydroxy phenyl, or aldehyde, which groups are related because all of them are reactive with phenolic resin; and where C is a hydrolyzable group such as methoxy, ethoxy, propoxy, butoxy, methoxy-ethoxy, fluorine, chlorine, bromine, iodine, or hydrogen; and where A and B can be the same or different groups and can be any of the groups listed for R or C, and can be other groups nonreactive toward phenolic resin, nonhydrolyzable and constituting space-fillers in the molecule, such as hydrocarbons.

Hydrolysis of a silane results in the formation of silanols. The silanol formed is dependent upon the number of hydrolyzable groups attached to silicon in the silane; the three possibilities being:

I. Where C is the only hydrolyzable group, a silanemonol, as we will now designate it, results:

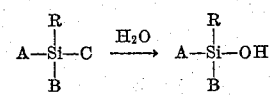

II. Where A and C are both hydrolyzable, a silanediol results:

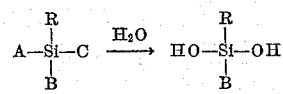

III. Where A, B, and C are hydrolyzable, a silanetriol results:

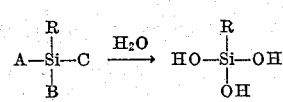

It is obvious to one skilled in the art that all three silanols are highly reactive and readily condense to form siloxanes.

I. Silanemonol

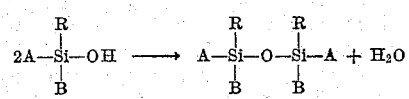

II. Silanediol

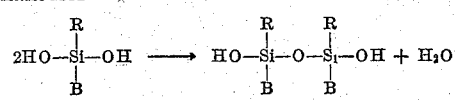

III. Silanetriol

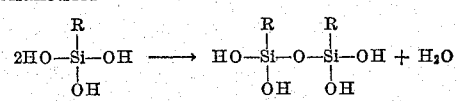

It is likewise obvious to one skilled in the art that in cases II and III, the condensation of the silanediols and silanetriols can continue to form polymers of high molecular weight of general formulas, respectively:

(II)

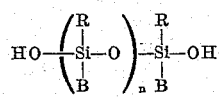

and (III)

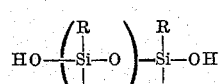

It is also likewise obvious to one skilled in the art that condensation products of silanediols can contain cyclic structures as well as long chain structures, and that condensation products of silanetriols can contain cross linked and cyclic structures as well as long chain structures.

We prefer to designate all siloxanes in terms of the general formula where $n$ stands for any whole number:

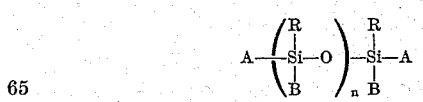

realizing that in cyclic or cross linked structures, the ratios A/Si and B/Si are less than indicated in our general formula. This is because A or B, when they are hydroxyl, can condense out with the formation of water and development of the cyclic or cross linked structures, or mixtures thereof, and obviously the ratios of A/Si and B/Si will change to the degree that the variable linkages occur.

Phenolic resin bonded abrasive wheels as currently manufactured exhibit instability upon exposure to water; the degree of instability is a function of the porosity or grade, the abrasive type and size, and the resin type and content. The wheels of our invention exhibit increased dry and wet strength, as measured by speed tests to destruction, and they exhibit increased grinding grade or durability in many grinding operations. Our invention wheels may be manufactured according to conventional resinoid procedures by simply replacing the untreated abrasive for the manufacture of conventional wheels with the silicone-treated abrasive herein described.

(1) Silicone-treated abrasive may be prepared by:
  a. Coating the grain with a solution or suspension of the desired silicone.
  b. Drying the coated grain to remove solvent.

Or, (2) By dissolving or suspending silicone in the liquid which is used to coat the abrasive and which causes bond to adhere to the abrasive prior to molding and curing.

In short, our invention may be achieved by depositing silicones of the types disclosed on the abrasive surface, whether the silicone be introduced as concentrate, solvent solution, or as part of the bonding system as placed on the abrasive.

One satisfactory silicone solution for treating abrasive for phenolic resin bonded articles is a water-based solution of gamma-amino propyl triethoxy silane, designated as g-APTES, which hydrolyzes and reacts to form resin. It is, before solution in water:

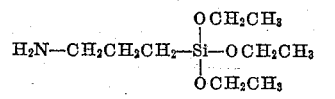

gamma-amino propyl triethoxysilane (g-APTES)

The amine group in the gamma position undergoes all of the classical amine reactions and is presumed to react with the phenolic resin resulting in chemical bonding to the silicone which has previously become fast to the abrasive. After solution in water the $OCH_2CH_3$ groups hydrolyze to become OH, the remainder becoming ethyl alcohol which is eventually driven off during drying. So therefore this becomes:

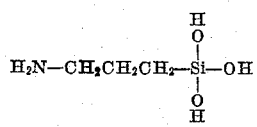

We do not wish to limit ourselves to a particular concentration of the treating solution nor to water as the only solvent or suspending medium. It is our belief that the use of the silicone is the main feature of our invention and to realize the benefits of our invention, it suffices for the silicone to be adequately placed on the surface of the abrasive. This may be accomplished by:

(1) Adding the pure silicone directly to the abrasive;
(2) Depositing the silicone from solution or suspension onto the abrasive and drying before bonding; or
(3) Depositing the silicone from solution or suspension in the plasticizer normally used in the manufacturing of phenolic bonded abrasive articles.

The strength improvement realized by the use of our invention depends upon the amount of silicone deposited on the abrasive surface; therefore, it follows that finer abrasives with greater surface areas require more treatment than do coarser abrasives. Our work has shown that the addition of even small amounts of silicone increases strength significantly and that the addition of moderate amounts of silicone results in substantial improvement in strength.

For purposes of calculating the surface area of abrasive grains of different grain sizes, the inches diameter of a sphere that just equals the screen opening of a standard U.S. screen of the same nominal size designation as the abrasive grain, is considered to equal the middle length axis of an orthorhombic bipyramid of axial ratio 1:2:4 which is taken to represent a geometrical approximation of the shape of average abrasive grains, and whose surface area and volume are therefore considered to correspond to the area and volume of the abrasive grains of that nominal size.

The inches dimension of the screen opening is called $h$ in our mathematical formula, which is $$\text{gms. silicone/sq. cm. abras. surf. area} = \frac{\text{gms. silicone/lb. abras.}}{k/h}$$

where $k$ is a proportionality factor that depends inversely on the density of the abrasive grain and $h$ is the diameter of a sphere in inches that is equal to the screen opening corresponding to the abrasive size designation. The surface area in square centimeters of one pound of abrasive is therefore $k/h$.

For aluminum oxide abrasive $k=621$
For silicon carbide abrasive $k=767$

Most of the effort in reducing our invention to practice was directed toward improved bonding of aluminum oxide abrasive, although we do not restrict our invention to aluminum oxide, but include other abrasives.

The following examples reveal:

(1) Preparation of silicone treating solution.
(2) Preparation of silicone-treated abrasive.
(3) Method of manufacturing phenolic resin bonded silicone-treated abrasive wheels.
(4) Strength of silicone-treated abrasive wheels.

Appended tables illustrate the claims of increased strength, stability, durability, and water resistance.

EXAMPLE I

A. *Preparation of g-APTES Silicone Treating Solution*

We added 1.2 parts by weight (p.b.w.) of g-APTES silicone to 98.8 p.b.w. of 1:1 mixture by weight of ethanol and water while stirring slowly at room temperature.

B. *Preparation of g-APTES Silicone-Treated Abrasive*

We weighed 30 pounds of 16 grit aluminum oxide abrasive into a rotating pan type vertical spindle mixing machine. Sixty grams of the 1.2% g-APTES silicone treating solution was added to this 30 pounds of abrasive, and the mixer was run until the liquid was thoroughly distributed on the abrasive. The wetted abrasive was dried in an electric oven at 145° C. for three hours. The dry silicone-treated abrasive was then ready to be made into abrasive wheels. The abrasive contained 0.024 gm. of silicone per pound of abrasive, which is calculated to be $1.8 \times 10^{-6}$ grams silicone per sq. cm. of abrasive surface area.

C. *Manufacture of Phenolic Resin Bonded g-APTES Silicone-Treated Abrasive Wheels*

We prepared about 25 pounds of a mixing containing g-APTES silicone-treated abrasive according to the following formula:

g-APTES silicone-treated 16 grit
  $Al_2O_3$ abrasive_____ 89.9 parts by weight.
Two stage powdered phenolic resin__ 7.4.
Cryolite—$Na_3AlF_6$ _____ 2.1.
Lime—CaO _____ 0.6.
Furfuraldehyde (furfural)_____ 45 cc./lb. of resin.
Neutral anthracene oil_____ 45 cc./lb. of resin.

The proper amount of furfural was added to the g-APTES silicone-treated abrasive in the rotating pan mixing machine of 30-pound capacity. After the abrasive was thoroughly wet, the three powdered ingredients were added to the wetted grain. After the powdered bond had been distributed uniformly over the wetted abrasive, the neutral anthracene oil was added to insure complete wetting of the bond. The mixing was screened to remove lumps and set aside for molding. A group of four wheels were molded 8 5/16 x 1 1/8 x 1"; each containing 5.20 pounds of silicone-treated abrasive mix. Another group of four wheels containing untreated 16 grit $Al_2O_3$ abrasive were pressed under identical conditions to serve as a control or standard product. After curing at a temperature of 185° C., all of the wheels were trued to insure proper geometry.

D. *Determination of Strength of Silicone-Treated Abrasive Wheels*

Two wheels of each group were placed in water at room temperature for a period of 10 days, while the two other wheels of each group remained dry at room temperature nearby. Speed tests destroying the wheels at the indicated speeds in surface feet per minute were conducted on the control and experimental wheels as follows:

SPEED TEST TO DESTRUCTION, S.F.P.M.

| | Dry | Wet, 10 days in room temperature water | Percent diff. |
|---|---|---|---|
| Control, 16 grit $Al_2O_3$ | 19,400 | 17,400 | |
| Untreated abrasive | 19,400 | 16,200 | |
| Average | 19,400 | 16,800 | 86.6 |
| Silicone-coated 16 grit $Al_2O_3$ from 1.2% g-APTES in 1:1 ethanol and water mixture | 20,900 | 20,400 | |
| | 21,500 | 20,400 | |
| Average | 21,200 | 20,400 | 96.3 |
| Speed difference relative to the control | | | 9.7 |

Silicone treating of the abrasive raised both dry and wet strength values of the wheels and brought them closer together as well, indicating both increased strength and increased stability.

PERCENTAGE SPEED STRENGTH COMPARATIVE ANALYSES

The column headed "Percent Diff." in the above table simply expresses the average wet speed strength after soaking ten days in water at about 22° C. room temperature as a percentage of the corresponding speed strength of dry unsoaked wheels. As a convenience, we have named this the "Percent Speed Strength Maintenance, Wet Soaked to Dry." High figures such as those above 90% or 95% represent one good measure of the improvement obtained with the invention wheels.

Similarly the line in the table showing the "Speed difference relative to the control" is the percent speed strength maintenance wet soaked to dry value for the invention wheels minus the corresponding value for the control wheels made with untreated abrasive. This figure is another measure of the advantage obtained with the invention wheels, and is from 3.4 to 11.4 in the numbered examples given. If converted to stress at breakage, each of these figures will be increased by about 75%, as will be explained further on in this specification.

Still another measure of the advantage of the invention wheels is shown later in Tables I, II and III. This is in the column headed "Wet % Increase Over Wet No Treat" and refers to the speed strength after soaking ten days in water at about 22° C. room temperature for invention wheels with various amounts of silicone on the abrasive compared to that of similar wheels with no silicone on the abrasive; and is expressed as the percent increase in speed strength due to the treatment. The largest improvement found was in the case of Tables I and III results where this measure for the finer grit size wheels gave values up to 60% increase, with actual wet speed strength of approximately 30,000 s.f.p.m., which is a very high value.

Speed strength increases of 3% or more, achieved by the invention, are considered to be advantageous and useful.

EXAMPLE II

A. *Preparation of g-APTES Silicone Treating Solution*

We added 1.2 parts by weight (p.b.w.) of g-APTES silicone concentrate to 98.8 p.b.w. of water while stirring slowly at room temperature.

B. *Preparation of g-APTES Silicone-Treated Abrasive*

We weighed 30 pounds of 16 grit aluminum oxide abrasive into a rotating pan type vertical spindle mixing machine. To this abrasive was added sixty grams of the 1.2% g-APTES silicone treating solution, and the mixer was run until the liquid was thoroughly distributed on the abrasive. Our calculations indicate that 0.024 gram of g-APTES silicone was added per pound of 16 $Al_2O_3$ grit. The wetted abrasive was dried in an electric oven at 145° C. for three hours and then the dry silicone-treated abrasive was ready to be made into abrasive wheels. The abrasive contained 0.024 gm. of silicone per pound of abrasive, which is calculated to be $1.8 \times 10^{-6}$ grams silicone per sq. cm. of abrasive surface area.

C. *Manufacture of Phenolic Resin Bonded g-APTES Silicone-Treated Abrasive Wheels*

Following the procedure and formula of Example I, we made a silicone-treated abrasive mix and molded wheels for speed tests to destruction, along with control wheels with untreated abrasive pressed under identical conditions.

D. *Determination of Strength of Silicone-Treated Abrasive Wheels*

Speed tests to destruction were conducted on the control and experimental wheels as follows:

SPEED TEST TO DESTRUCTION, S.F.P.M.

| | Dry | Wet, 10 days in room temperature water | Percent diff. |
|---|---|---|---|
| Control, 16 grit $Al_2O_3$ | 19,400 | 17,400 | |
| Untreated Abrasive | 19,400 | 16,200 | |
| Average | 19,400 | 16,800 | 86.6 |
| Silicone-treated 16 grit, $Al_2O_3$ from 1.2% g-APTES in water | 21,500 | 19,900 | |
| | 21,400 | 20,900 | |
| Average | 21,400 | 20,400 | 95.4 |
| Speed difference relative to the control | | | 8.8 |

Silicone treating the abrasive from water solution raised the dry and wet strength values of the wheels as much as when treating from 1:1 ethanol and water.

EXAMPLE III

A 1.2 weight percent water-based g-APTES silicone solution was prepared as in Example II. Following the procedure and heat-treatment disclosed in Example II, 46 grit aluminum oxide abrasive was treated with the 1.2% g-APTES water solution, so as to deposit 0.144 gram of g-APTES on each pound of abrasive which is calculated to be $3.2 \times 10^{-6}$ grams silicone per sq. cm. of abrasive surface area. The treated abrasive was bonded with phenolic resin as described in Example I, according to the following formula:

| | |
|---|---|
| g-APTES silicone-treated 46 grit Al$_2$O$_3$ abrasive | 87.9 p.b.w. |
| Two-stage powdered phenolic resin | 8.9. |
| Cryolite | 2.5. |
| Lime | 0.7. |
| Furfural | 60 cc./lb. of resin. |
| Neutral anthracene oil | 45 cc./lb. of resin. |

Wheels 12 x 1 x 4" of medium grade pressed from this mixing and from a similar mixing made with untreated abrasive were cured and finished according to the procedure described in Example I. Speed test strength values for this example are included in Table I toward the end of this disclosure; and as in all of our tests, silicone-treated abrasive results in increased strength and increased water resistance.

EXAMPLE IV

We added 2.4 parts by weight of g-APTES silicone concentrate to 97.6 p.b.w. of water while stirring slowly at room temperature. Aluminum oxide abrasive, 60 grit, was mixed with the silicone and heat treated as described in Example II, using sufficient 2.4% g-APTES solution to deposit 0.18 gram of g-APTES on each pound of abrasive, which is calculated to be $2.8 \times 10^{-6}$ grams silicone per sq. cm. of abrasive surface area. Soft and medium grade 12 x 1 x 4" wheels were made for speed testing along with control wheels made with untreated abrasive in an identical manner. Speed test strength data taken on these and on companion wheels containing smaller amounts of g-APTES treatment are appended as Table II. The advantages of our invention are again obvious.

EXAMPLE V

A 1.2 weight percent water-based g-APTES silicone solution was prepared as in Example II. Aluminum oxide abrasive, 120 grit, was mixed with the silicone and heat treated as described in Example II, using sufficient 1.2% g-APTES solution to deposit 0.288 gram of g-APTES on each pound of abrasive, which is calculated to be $2.3 \times 10^{-6}$ grams silicone per sq. cm. abrasive surface area. Medium grade 12 x 1 x 4" wheels were pressed with this abrasive and with untreated abrasive under identical conditions and were cured and speed tested. Table I shows the improvement in strength and water resistance when g-APTES silicone-treated, 120 grit, Al$_2$O$_3$ abrasive is used.

EXAMPLE VI

A 2.4 weight percent water-based g-APTES silicone solution was prepared as described in Example IV. Silicon carbide abrasive, 120 grit, was mixed with the silicone and heat treated as described in Example II, using sufficient 2.4% g-APTES solution to deposit 0.240 gram of g-APTES on each pound of abrasive, which is calculated to be $1.5 \times 10^{-6}$ grams silicone per sq. cm. abrasive surface area. Medium grade 12 x 1 x 4" wheels were made for speed testing along with untreated abrasive control wheels. Table III shows the improvement in strength and water resistance when g-APTES treated SiC abrasive is used.

EXAMPLE VII

A 2.4 weight percent water solution of g-APTES was prepared and used to treat 60 grit Al$_2$O$_3$ abrasive as in Example IV, with 0.17 gram of g-APTES on each pound of abrasive, which is calculated to be $2.7 \times 10^{-6}$ grams silicone per sq. cm. of abrasive surface area. Soft grade wheels of size 12 x 1 x 4" for speed testing were made according to the following formula:

| | |
|---|---|
| g-APTES silicone-treated 60 grit Al$_2$O$_3$ abrasive | 89.3 p.b.w. |
| Liquid phenolic resin | 2.1. |
| Two-stage powdered phenolic resin | 8.6. |
| Neutral anthracene oil | 30 cc./lb. of resin powder. |

All these wheels, and similar control wheels made in an identical manner but with untreated abrasive were baked at a temperature of 175° C. and finished as previously described. Speed tests to destruction were conducted on the control and experimental wheels as follows:

SPEED TEST TO DESTRUCTION, S.F.P.M.

| | Dry | Wet, 10 days in room temperature water | Percent diff. |
|---|---|---|---|
| Control, 60 grit Al$_2$O$_3$ Untreated Abrasive | 19,200 20,100 20,400 | 17,300 17,300 17,600 | |
| Average | 19,900 | 17,400 | 87.4 |
| Silicone-coated 60 grit Al$_2$O$_3$ with 0.17 gram g-APTES per pound of abrasive | 22,300 22,600 21,100 | 21,100 21,400 21,400 | |
| Average | 22,000 | 21,300 | 97.0 |
| Speed difference relative to the control | | | 9.6 |

EXAMPLE VIII

We mixed 28.6 grams of g-APTES silicone concentrate with 2.62 pounds of liquid phenolic resin. The mixture was stirred until only one phase was evident. This mixture was applied to 71.59 pounds of 24 grit Al$_2$O$_3$ abrasive, giving $1.8 \times 10^{-5}$ grams silicone per sq. cm. of abrasive surface. The rest of the mixture was then made with this liquid coated abrasive without any heat treatment. Two stage powdered phenolic resin, cryolite, and neutral anthracene oil were added to the wet abrasive, the mixing being made according to the following formula:

| | |
|---|---|
| 24 Grit Al$_2$O$_3$ abrasive | 79.5 parts by weight. |
| g-APTES silicone concentrate | 0.40 gram lb. of 24 grit Al$_2$O$_3$. |
| Liquid phenolic resin | 2.9 parts by weight. |
| Two stage powdered phenolic resin | 11.7 parts by weight. |
| Cryolite | 5.9 parts by weight. |
| Neutral anthracene oil | 35 cc./lb. of resin powder. |

Wheels 12 x 1 x 4" of medium-hard grade were made for speed tests to destruction; control wheels with no added silicone but otherwise made in an identical manner were included, also. The speed results were as follows:

SPEED TEST TO DESTRUCTION, S.F.P.M.

|  | Dry | Wet 10 days in room temperature water | Percent Diff. |
| --- | --- | --- | --- |
| Control, untreated abrasive | 22,000<br>21,400<br>22,000 | 20,400<br>18,900<br>19,500 |  |
| Average | 21,800 | 19,600 | 89.9 |
| Silicone-treated abrasive wheel (silicone deposited from liquid resin plasticizer) | 22,000<br>22,300<br>21,100 | 22,600<br>22,000<br>21,700 |  |
| Average | 21,800 | 22,100 | 101.3 |
| Speed difference relative to the control |  |  | 11.4 |

This shows that improvement in wet strength and water resistance can be realized without treating the abrasive separately.

EXAMPLE IX

We mixed 132.4 grams of g-APTES silicone concentrate with 496 cc. of furfural and stirred for several minutes. This mixture was applied to 76.95 pounds of 120 grit $Al_2O_3$ abrasive, giving $1.4 \times 10^{-5}$ grams silicone per sq. cm. of abrasive surface. This liquid-coated abrasive was then used in the rest of the mixing without any heat treatment. Two stage powdered phenolic resin, cryolite, lime, and neutral anthracene oil were added according to the following formula:

120 grit $Al_2O_3$ abrasive_____ 85.5 parts by weight.
g-APTES silicone concentrate____ 1.72 grams/lb. 120 grit $Al_2O_3$.
Furfural_____ 50 cc./lb. of resin powder.
Two stage powdered phenolic resin_ 11.0 parts by weight.
Cryolite_____ 3.0 parts by weight.
Lime_____ 0.5 part by weight.
Neutral anthracene oil_____ 30 cc./lb. of resin powder.

In addition to medium grade wheels molded from the above mixing, control wheels with no added silicone were made also. The speed test results were as follows:

SPEED TEST TO DESTRUCTION, S.F.P.M.

|  | Dry | Wet 10 days in room temperature water | Percent Diff. |
| --- | --- | --- | --- |
| Control, untreated abrasive | 28,000<br>27,700<br>28,000 | 21,700<br>22,600<br>22,600 |  |
| Average | 27,900 | 22,300 | 80.0 |
| Silicone-treated abrasive g-APTES deposited from furfural plasticizer | 27,700<br>28,000<br>28,900 | 25,200<br>23,900<br>24,500 |  |
| Average | 28,200 | 24,500 | 86.9 |
| Speed difference relative to the control |  |  | 6.9 |

EXAMPLE X

A solution of g-APTES silicone in water was prepared by adding 2.4 parts by weight g-APTES to 95.2 parts by weight water with stirring. To this solution, 2.4 parts by weight vinyl silane was added with stirring. The resulting silicone solution contained silicone molecules with the reactivity of both amines and olefins; such solution can be used to prepare treated abrasive suitable for use with many bonding materials, eliminating the need for two or more treated abrasive supplies.

To 22 pounds of 60 grit $Al_2O_3$ abrasive 155.8 grams of mixed silicone solution was added. The treated abrasive was dried at 150° C. for three hours in an electric oven, producing abrasive having $2.7 \times 10^{-6}$ grams amino silane plus an equal amount of vinyl silane per sq. cm. of abrasive surface area. The wheels that were manufactured were of medium-hard grade and gave the following results when speed tested to destruction:

SPEED TEST TO DESTRUCTION, S.F.P.M.

|  | Dry | Wet 10 days in room temperature water | Percent Diff. |
| --- | --- | --- | --- |
| Control, 60 grit $Al_2O_3$ untreated abrasive | 25,800<br>26,100<br>25,200 | 22,600<br>21,900<br>21,400 |  |
| Average | 25,700 | 22,000 | 85.6 |
| Silicone-treated 60 grit $Al_2O_3$, amino-vinyl silane mixture | 27,700<br>26,700<br>26,100 | 26,100<br>25,500<br>25,800 |  |
| Average | 26,800 | 25,800 | 96.4 |
| Speed difference relative to the control |  |  | 10.8 |

EXAMPLE XI

A 25% by weight solution of Naval Ordnance Laboratory #24, allyl trichlorosilane-resorcinol reaction product in xylene, was diluted to 2½% by the addition of sufficient dry xylene. To 23.33 pounds of 60 grit $Al_2O_3$ abrasive in a rotating pan vertical spindle mixing machine 188 cc. of the 2½% solution was added. After mixing was completed, the treated abrasive was air dried for one hour; following which the grain was dried for three hours at 150° C. in an electric oven, giving $3.2 \times 10^{-6}$ grams silicone per sq. cm. of abrasive surface. The following speed test results were obtained on medium grade wheels made with this treated abrasive, along with control wheels made with untreated abrasive in an otherwise identical manner:

SPEED TEST TO DESTRUCTION, S.F.P.M.

|  | Dry | Wet 10 days in room temperature water | Percent Diff. |
| --- | --- | --- | --- |
| Control, untreated abrasive | 23,000<br>24,500<br>24,500 | 18,900<br>19,200<br>19,200 |  |
| Average | 24,000 | 19,100 | 79.6 |
| Silicone-coated 60 grit $Al_2O_3$ with 0.20 grams allyl trichlorosilane-resorcinol reaction product per pound of abrasive | 25,500<br>24,800<br>25,500 | 20,800<br>21,400<br>20,800 |  |
| Average | 25,300 | 21,000 | 83.0 |
| Speed difference relative to the control |  |  | 3.4 |

When considering the chemical structural formulas of the organic functional silicones as used in the examples for the groups designated "R" in the earlier discussion of this specification, which in most of the examples is normal propyl amine, $H_2N-CH_2CH_2CH_2-$, we can substitute, as in Example XI

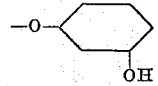

meta hydroxy phenolate. Other phenolates such as ortho and para hydroxy phenolate or 3,5 dimethyl phenolate

or meta methyl phenolate,

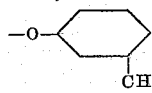

or other substituted or unsubstituted phenolates can also be used.

Also for R we can use hydroxy phenyl groupings —$C_6H_4OH$, or the cresylics —$C_6H_3(CH_3)OH$ or other substituted hydroxy phenyls.

For R we can substitute aldehydes such as formaldehyde, acetaldehyde, benzaldehyde, furfuraldehyde (furfural) or any aldehyde with not more than 20 carbon atoms.

Other amines besides propyl amine can be used where R appears including butyl amine, phenyl amine, or any amine with 3 to 20 carbon atoms in the group.

Also for R we can use organic groups containing the epoxy radical, such as 3-(2,3-epoxypropoxy)-propyl triethoxy silane. Other compounds containing the epoxy radical and, in addition, 2 to 20 carbon atoms to constitute the R group, can be used.

Compounds containing amine, or the epoxy radical, attached to one or two carbon atoms in the R group can be used when the silane is stable to heat under the drying conditions employed prior to reaction with the phenolic resin.

Silanes containing more than 20 carbon atoms can be used when the bulkiness of the carbon chains is not sufficient to sterically hinder the reaction between the reactive groups and the resin bond.

In order to demonstrate the effect of different amounts of g-APTES silicone on the speed test strength of wheels made with aluminum oxide abrasive of different grain sizes, Examples III and V were amplified by similarly treating the abrasives with different amounts of the silicone and then making it into wheels and testing them as given in Table I below.

To further demonstrate the effect of different amounts of g-APTES silicone on wheels of soft and medium grades, including the wheels of Example IV and other wheels identical with them except for lesser amounts of silicone put on the abrasive grain, the results tabulated in Table II below were obtained.

TABLE II

*Relation of Strength of Soft and Medium Grade 60 Grit Aluminum Oxide Abrasive Wheels to the Amount of Silicone Treatment Added to the Abrasive*

SPEED TEST TO DESTRUCTION, S.F.P.M. AVERAGE OF 3 WHEELS

| Ex. No. | Grade | Amount of g-APTES per Square Centimeter of Abrasive Surface | Dry | Wet[1] | Percent Diff. Dry to Wet | Wet Percent Increase Over Wet No Treat. |
|---|---|---|---|---|---|---|
| IV | Soft | 0 grams | 21,400 | 17,600 | 82 | |
|  | do | $1.0 \times 10^{-6}$ | 22,600 | 21,700 | 96 | 23 |
|  | do | $1.9 \times 10^{-6}$ | 24,500 | 22,600 | 92 | 28 |
|  | do | $2.8 \times 10^{-6}$ | 25,100 | 23,200 | 92 | 32 |
|  | Medium | 0 grams | 22,600 | 21,000 | 93 | |
|  | do | $1.0 \times 10^{-6}$ | 25,500 | 24,500 | 96 | 17 |
|  | do | $1.9 \times 10^{-6}$ | 25,800 | 25,000 | 97 | 19 |
|  | do | $2.8 \times 10^{-6}$ | 26,100 | 25,300 | 97 | 21 |

[1] Wet 10 days in water at room temperature; all wheels speed tested as taken from the water.

Example VI employed 120 grit silicon carbide abrasive. Table III below gives the speed test results on these wheels with treated vs. untreated abrasive and also on two additional groups of wheels that were identical except for employment of lesser amounts of silicone.

TABLE I

*Relation of Strength of Medium Grade Wheels With Various Sized Abrasives to the Amount of Silicone Treatment Added to the Abrasive*

SPEED TEST TO DESTRUCTION, S.F.P.M. AVERAGE OF 3 WHEELS

| Ex. No. | Abrasive Type | Grit Size | Amount of g-APTES per Square Centimeter of Abrasive Surface | Dry | Wet[1] | Percent Diff. Dry to Wet | Wet Percent Increase Over Wet No. Treat. |
|---|---|---|---|---|---|---|---|
| III | $Al_2O_3$ | 16 | 0 grams | 17,200 | 15,700 | 91 | |
|  | $Al_2O_3$ | 16 | $1.5 \times 10^{-6}$ | 19,000 | 18,800 | 99 | 20 |
|  | $Al_2O_3$ | 16 | $5.4 \times 10^{-6}$ | 20,200 | 19,500 | 97 | 24 |
|  | $Al_2O_3$ | 16 | $10.9 \times 10^{-6}$ | 20,000 | 19,500 | 98 | 24 |
|  | $Al_2O_3$ | 46 | 0 grams | 19,900 | 16,500 | 83 | |
|  | $Al_2O_3$ | 46 | $0.5 \times 10^{-6}$ | 22,000 | 20,100 | 91 | 22 |
|  | $Al_2O_3$ | 46 | $1.1 \times 10^{-6}$ | 22,000 | 21,000 | 96 | 27 |
|  | $Al_2O_3$ | 46 | $2.1 \times 10^{-6}$ | 22,300 | 21,800 | 98 | 32 |
|  | $Al_2O_3$ | 46 | $3.2 \times 10^{-6}$ | 22,800 | 22,000 | 97 | 33 |
| V | $Al_2O_3$ | 80 | 0 grams | 22,400 | 18,900 | 84 | |
|  | $Al_2O_3$ | 80 | $0.3 \times 10^{-6}$ | 23,300 | 20,300 | 87 | 7 |
|  | $Al_2O_3$ | 80 | $0.8 \times 10^{-6}$ | 25,100 | 22,900 | 91 | 21 |
|  | $Al_2O_3$ | 80 | $1.6 \times 10^{-6}$ | 25,700 | 23,500 | 91 | 24 |
|  | $Al_2O_3$ | 80 | $1.6 \times 10^{-6}$ | 26,100 | 23,600 | 91 | 25 |
|  | $Al_2O_3$ | 80 | $2.4 \times 10^{-6}$ | 25,700 | 23,900 | 93 | 26 |
|  | $Al_2O_3$ | 120 | 0 grams | 26,400 | 21,700 | 82 | |
|  | $Al_2O_3$ | 120 | $0.2 \times 10^{-6}$ | 28,300 | 23,700 | 84 | 9 |
|  | $Al_2O_3$ | 120 | $0.6 \times 10^{-6}$ | 28,800 | 26,200 | 91 | 21 |
|  | $Al_2O_3$ | 120 | $1.1 \times 10^{-6}$ | 29,200 | 27,400 | 94 | 26 |
|  | $Al_2O_3$ | 120 | $1.7 \times 10^{-6}$ | 29,200 [2](d.n.b.) | 27,600 | 95 | 27 |
|  | $Al_2O_3$ | 120 | $2.3 \times 10^{-6}$ | 29,200 [2](d.n.b.) | 29,200 [2](d.n.b.) | 100 | 35+ |

[1] Wet 10 days in water at room temperature; all wheels speed tested as taken from the water.

[2] d.n.b. means wheel could not be broken at the speed limit of the machine, i.e. "did not break".

TABLE III

*Relation of Strength of Medium Grade 120 Grit SiC Wheels to the amount of Silicone Treatment Added to the Abrasive*

SPEED TEST TO DESTRUCTION, S.F.P.M. AVERAGE OF 3 WHEELS

| Ex. No. | Silicone per Square Centimeter of Abrasive Surface | Dry | Wet 10 days in Room Temp. Water | Percent Diff. Wet To Dry | Wet Percent Increase Over Wet No Treat. |
|---|---|---|---|---|---|
| VI | 0 grams | 26,400 | 18,800 | 71 | |
|  | $0.8 \times 10^{-6}$ | 29,800 | 27,300 | 92 | 45 |
|  | $1.2 \times 10^{-6}$ | 31,400 | 27,500 | 88 | 46 |
|  | $1.5 \times 10^{-6}$ | 31,000 | 30,100 | 97 | 60 |

Grinding tests were made to study the grinding action and performance of our invention wheels vs. identical control wheels made with untreated abrasive. The wheels were made in similar manner to previous example wheels. However, in the 120 grit wheels, somewhat more silicone was employed than even the highest amount used for 120 grit wheels in Table I because, at the maximum amount used in Table I, the wet strength of the wheels had not leveled off to a maximum constant value. Obviously, for best grinding comparisons it was desired to get a maximum effect in line with the maximum amounts used per square centimeter of abrasive surface in the coarser grain sizes of Table I.

Table IV below gives the results obtained for wet grinding with a #2 Cincinnati centerless grinding machine on through-feed of 150 cylindrical steel pieces 5″ long x 0.560″ diameter of SAE 52100 hardened steel of $R_c=60$, removing 32 mils from the diameter in three passes for each test. Standardized conditions of feed, speeds, wheel truing etc. were maintained throughout the test.

TABLE IV

*Performance of Silicone Treated Abrasive Wheels—#2 Cincinnati Centerless Grinding Machine*

| $Al_2O_3$ Grit Size | Grade of Wheel | Amount of g-APTES per Square Centimeter of Abrasive Surface | Total Diametric Wheel Wear, Mils | First Run Power, kw. | Remarks |
|---|---|---|---|---|---|
| 60 | Medium | 0 grams | 105 | 9.1 | Good action. |
| 60 | do | $2.7 \times 10^{-6}$ | 44 | 11.5 | Do. |
| 60 | Medium-hard | 0 grams | 54 | 11.6 | Good action, some heavy chatter. |
| 60 | do | $2.7 \times 10^{-6}$ | 34 | 13.2 | Good action, some medium chatter. |
| 120 | Medium | 0 grams | 217 | 7.7 | Good action. |
| 120 | do | $3.4 \times 10^{-6}$ | 101 | 9.2 | Do. |
| 120 | Medium-hard | 0 grams | 125 | 8.9 | Do. |
| 120 | do | $3.4 \times 10^{-6}$ | 61 | 10.4 | Do. |

Each test value in the table was obtained from grinding on a new lot of 150 of the cylindrical steel pieces. These were first given a roughing pass with the removal of 20 mils from the diameter; then a pass removing 10 mils from the diameter; and finally a finishing pass removing 2 mils from the diameter. The tabulated wheel wear values are the total for each test and correspond to the entire 32 mils stock removal from the 150 pieces. The power is shown in the table for each first run in which the stock removal was 20 mils.

These grinding results show that the invention wheels continue to show the good grinding action of the control wheels made with untreated abrasive, but wear very much less with only slightly more power consumption. The low wheel wear means that the invention wheels will last a far longer time in commercial use and will grind many thousands more pieces before wearing out.

The finished abrasive article consists of abrasive bonded with phenolic resin and having on the surface of the abrasive and linked to the phenolic resin siloxanes of the general formula previously described. A very small amount of the right silicone is sufficient to achieve improved results. Since silicone derived from the amine, epoxyphenolate, hydroxyphenyl and aldehyde types of silanes constitute the active material, it is estimated that the silicone residue on treated abrasive should be at least 50% of this active material for best results. The examples given involve the coating of the abrasive with silicone of from about $10^{-7}$ grams of silicone/cm.$^2$ of abrasive surface area to about $10^{-5}$ grams/cm.$^2$ as given in Tables I, II and III. For measurable results, it appears that an amount would be desirable of at least $10^{-8}$ grams per sq. cm. of abrasive surface area. The Table I data taken together with other similar data indicate that an addition of an amount of silicone as large as $5 \times 10^{-3}$ grams/cm.$^2$ or even $1 \times 10^{-3}$ grams/cm.$^2$ of abrasive surface of the grains would continue to show good results. However, it does not seem satisfactory from a manufacturing point of view ordinarily to use amounts of silicone in excess of about 25% to 50% by weight of the abrasive.

Amounts of 2 to $3 \times 10^{-7}$ grams of silicone have resulted in a wet speed test breakage improvement over no treatment of around 8% as shown in Table I. This improvement percent would be around 14% when converted to stress at breakage, as will now be described. This indicates that even as small an amount as $10^{-8}$ grams of silicone/cm.$^2$ of abrasive surface would give some measure of improved results over untreated abrasive.

It is a well known fact that the rotation of a grinding wheel causes stress to be generated which is proportional to the square of the speed. Therefore, to convert a grinding wheel speed test to destruction into the stress that causes the wheel structure to break, which measures the pounds per square inch strength of the wheel structure, one must square the speed results. Thus the true importance of degree of improvement achieved by our invention becomes much more apparent when converted to strength comparisons by squaring the results of speed tests to destruction, as will now be done for the specific data of Example I.

For example, in Experiment I which is typical of the degree of improvement in wet vs. dry strength by means of our invention, the comparative strength numbers proportional to the square of the rotational speed at breakage become:

EXAMPLE I

*Relative Strength at Fracture*

|  | Dry | Wet 10 Days in Room Temp. Water | Percent Diff. |
|---|---|---|---|
| Control Wheels Av | 376 | 282 | 75.0 |
| Invention Wheels Av | 450 | 416 | 92.4 |
| Strength difference relative to the control |  |  | 17.4 |

Note.—(This compares with speed difference relative to the control= 9.7%).

Other silicones such as vinyl silane have been proposed as being advantageous for coating abrasive grains to improve bonding with phenol formaldehyde resin bonds, and we have made experiments with such a material. We took aluminum oxide #16 grain size abrasive and coated it with a 1% aqueous treating solution of tris-2-methoxy ethoxy vinyl silane, also containing approximately 0.02% NaOH to hydrolyze the silane. Two hundred grams of this solution were used per 100 pounds of abrasive, giving 0.02 gram of vinyl silane per pound of abrasive, which corresponds to $1.5 \times 10^{-6}$ grams of vinyl silane per sq. cm.

of abrasive grain surface. The treating procedure was very similar to that of Example II except for the use of the vinyl silane in place of amino silane. The grain was dried at 125° C. and subsequently heat-treated at 275° C. for one hour.

Wheels were made as in Examples I and II with this abrasive and companion wheels were made with grain having no abrasive treatment. After truing in the usual manner, six wheels of each lot were speed tested to destruction in exactly the same way as in the examples of our invention, with the following results:

16 *Grit Alumina Abrasive Wheels*
SPEED TEST TO DESTRUCTION, S.F.P.M.

| Abrasive Treatment | Wheels Designation | Dry | Wet, 10 Days in Room Temp. Water | Percent Diff. |
|---|---|---|---|---|
| No abrasive treatment | 1 and 4 | 18,200 | 15,080 | |
| | 2 and 5 | 18,690 | 15,080 | |
| | 3 and 6 | 18,520 | 14,910 | |
| | | [1] 18,470 | [1] 15,020 | 81.4 |
| Vinyl Silane Treated Abrasive. | V1 and V4 | 17,900 | 14,910 | |
| | V2 and V5 | 18,070 | 14,760 | |
| | V3 and V6 | 17,280 | 15,390 | |
| | | [1] 17,750 | [1] 15,020 | 84.6 |

[1] Average.

It is thus seen that the vinyl silane treated abrasive wheels were weaker in the dry condition than untreated abrasive wheels and that the vinyl silane was ineffective for improving the speed test to destruction values for the wheels, and this was true for both the wheels in the dry condition and also when tested wet after soaking 10 days in room temperature water. This is an entirely different result from that obtained with our invention, when a different kind of silicone is used for the abrasive grain treatment. In practically every example of our invention, the 10 day soaked wet strength of our wheels was greater than the dry strength of the original unsoaked control wheels made with untreated abrasive grain.

It is our theory that the alkylation of phenols by vinyl silicones is not likely under the mild conditions encountered in phenolic resin curing. Since the superior performance of amino silicone-treated abrasive phenolic resin bonded wheels is so reproducible, it appears that a consistent bond is being formed between the phenolic resin and the amino group. Our data show consistent improvement of bonding when amino silicone treatments are employed. In addition to amino silicones, other silicones classified as phenylates, epoxies hydroxy phenyls or aldehydes are reactive toward phenolic resin and may be used.

The resin bonded abrasive articles may have weight percents of abrasive in them that include as much as about 99% or as little as 5% or even less depending upon such factors as the use for which the article is designed, the grain size of the abrasive, etc. Most abrasive articles will fall into the grain size range from #4 grit to about #220 grit. At least 50% of the abrasive weight is alumina and silicon carbide in most resin-bonded grinding wheels and the weight of abrasive in them is at least 50% of their total weight.

The hardness of an abrasive may be expressed on the Knoop scale, often abbreviated into "$K_{100}$," meaning the penetration hardness obtained with a special diamond-shaped diamond indenter under a load of 100 grams. The hardness number varies inversely as the penetration. Some typical $K_{100}$ values for some abrasives are $B_4C$ 2800, SiC 2500, $Al_2O_3$ 2000, garnet 1350, $ZrO_2$ 1200. The definition of abrasives can vary, but one definition that can be written is to say that the Knoop hardness is at least 1000.

In addition to abrasive grains and phenolic resins for bonding purposes, other materials are commonly employed in such grinding wheels and other abrasive products. These may include materials classed as fillers such as cryolite, clay, etc., pore-inducing materials such as naphthalene, sawdust, etc., reinforcing fibers and meshes, steel rings, lugs etc. None of the materials just named are considered to be part of the bond as defined in our invention. Materials which are liquid or flow during the baking during which the resin bonding is matured and which remain in the wheel after baking, are considered as part of the bond. Such materials may include added resins other than phenolics, plasticizers for the mixture such as furfural, furfuryl alcohol, cresylic acid, etc., and dampening agents such as neutral anthracene oil, light paraffin oil, creosote, etc., to the extent that they remain in the baked article. In this specification the general term plasticizer means a material that helps dry bond to adhere to the abrasive grains, promotes compression and flow of the mixture during molding, and helps to produce strength in the molded product before baking. In general, the plasticizers are solvents for the dry phenolic resin. The general term dampening agent is applied to a liquid additive for the mix which promotes and helps maintain uniform distribution throughout the entire mix of dry granular and powdered mix constituents, without being a solvent for the powdered phenolic resin.

Baking temperatures and times will vary greatly with the wheel composition including such factors as type and amount of curing catalyst and amount and kind of added low-temperature curing resins if any are used, the size and shape of the products, the manner of setting used in the ovens, etc. Curing may be carried out for long times at relatively low oven temperatures or short times at high temperatures. In general, small articles can be cured satisfactorily in very short times. Since all parts of small products are very close to their surfaces, the heat can penetrate rapidly and volatiles can escape easily. Thick wheels and dense settings require more time for the heat to penetrate. Ovens may be heated by gas, steam or electricity. Dielectric heat penetrates very rapidly and curing may be almost instantaneous. All this is well known to those skilled in the art. Maximum curing temperatures may vary in the range from about 100° C. to about 225° C. to mature the resin bond to a thermoset condition.

Considering all the examples, our invention is seen to produce a phenolic resin bonded grinding wheel that has a speed test to destruction in the wet condition after soaking in water at room temperature (about 22° C.) for 10 days that is usually at least 90% of that for the dry condition without soaking, and for the best wheels with optimum amount of siloxane on the abrasive grain is at least 95% of that for the dry condition.

The examples employed aluminum oxide and silicon carbide, but other abrasive such as other oxides, other carbides, etc. may be used. The grain sizes in the examples were 16, 24, 46, 60, 80, and 120, but other grain sizes can be used. The invention has particular usefulness for grinding wheels in the abrasive grain size range #220 and coarser.

It is well known that one grinding wheel is superior for one particular grinding operation, another for another one, a third for a third and so on. Even when grinding the same material it is usually the case that there is no specific grinding wheel which is the best because variations of surface speed and pressure and the like make a difference. Consequently a selection of the best mode of the invention is meaningless but to comply with the statute we select as the best mode Example IV, in general. But also it is obvious that different strengths and amounts of the treating solution, different drying temperatures and times, etc., will be varied advantageously when different apparatus is used and different wheels are made, all within the scope of the invention.

As shown by the examples, the raw batch for the manufacture of grinding wheels and the grinding wheels themselves may contain lime, a dehydrating agent which improves the manufacture of phenolic resin bonded grinding wheels, and cryolite, a grinding promoter, or other dehydrating agents or other grinding promoters can be used. These are known as fillers and there are many other fillers that can be used. Hence, when we say that the abrasive grit is bonded with phenolic resin it still is bonded with phenolic resin even though there are fillers therein.

It will thus be seen that there has been provided by this invention phenolic resin bonded grinding wheels in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

We claim:

1. An abrasive article comprising abrasive grains bonded with phenolic resin bond adhered to the abrasive grain with the aid of an organo functional polysiloxane coating on said grains which is compatible with and reactively linked with said phenolic resin, at least five percent by weight of said article being composed of abrasive grains selected from the group consisting of oxide and carbide and mixtures thereof having a Knoop hardness greater than 1,000 including $Al_2O_3$, SiC, $B_4C$, garnet, $ZrO_2$ and mixtures thereof, said polysiloxane being derived from the basic silane structure

where R is a chemical group reactive with said phenolic resin and selected from the group consisting of amine, epoxy, phenolate, hydroxy phenyl and aldehyde, C is a hydrolyzable chemical group, and A and B are the same or different chemical groups selected from the group consisting of R and C and chemical groups non-reactive toward phenolic resin and non-hydrolyzable, said article having superior dry strength and water resistance compared to a similar article having no polysiloxane phenolic linkage coating on said grains, whereby stronger bonding is provided between the particles and the bond for said abrasive article.

2. Abrasive grain adapted to be bonded with phenolic resin and having adhered to the grain an organo functional polysiloxane coating which aids in adhering the phenolic resin bond, said polysiloxane coating being compatible with and reactively linked with said phenolic resin, said grain being selected from the group consisting of oxide and carbide and mixtures thereof having a Knoop hardness greater than 1,000 including $Al_2O_3$, SiC, $B_4C$, garnet, $ZrO_2$ and mixtures thereof, said polysiloxane being derived from the basic silane structure

where R is a chemical group reactive with said phenolic resin and selected from the group consisting of amine, epoxy, phenolate, hydroxy phenyl and aldehyde, C is a hydrolyzable chemical group, and A and B are the same or different chemical groups selected from the group consisting of R and C and chemical groups non-reactive toward phenolic resin and non-hydrolyzable, said grain when bonded with a phenolic resin bond having superior dry strength and water resistance compared to a similar article having no polysiloxane phenolic linkage on said grains, whereby stronger bonding is provided between the particles and the bond for the abrasive article formed therefrom.

3. Abrasive grain according to claim 2, in which at least 50% of the abrasive weight is selected from the group consisting of aluminum oxide and silicon carbide abrasive and mixtures thereof of grain size in the range about #220 and coarser, coated with silicone derived from gamma-amino propyl triethoxysilane in amount of about $10^{-7}$ to about $10^{-5}$ grams per square centimeter of abrasive grain surface.

4. Abrasive grain according to claim 2, in which the abrasive grain is coated with said silicone in amount at least $10^{-8}$ grams per square centimeter of abrasive surface of the grain.

5. An abrasive article according to claim 1 wherein the weight per cent of abrasive is between 99% and about 5% and the grit grain size ranges from No. 4 grit to about #220 grit.

6. An abrasive article according to claim 1 wherein the amount of organo functional polysiloxane coating material is not in excess of 50% by weight of the abrasive.

7. A grinding wheel according to claim 1 in which the polysiloxane coating is derived from gamma-amino propyl tri-ethoxysilane.

8. Process for manufacturing a bonded abrasive product in accordance with claim 1 of superior dry strength and water resistance including the steps of coating abrasive grains selected from the group consisting of $Al_2O_3$ and SiC and mixtures thereof with an amount, at least $10^{-8}$ grams per square centimeter of abrasive surface, of silicone selected from the group consisting of silane, hydrolyzed silane, siloxane and mixtures thereof, derived from the basic silane structure

where R is a chemical group selected from the group consisting of amine, epoxy, phenolate, hydroxy phenyl and aldehyde, C is a hydrolyzable chemical group, and A and B are the same or different chemical groups selected from the group consisting of R and C and chemical groups non-reactive toward phenolic resin and non-hydrolyzable, adding phenol formaldehyde resin selected from the group consisting of powdered resin and liquid resin and mixtures thereof in amount of at least 5% by weight of the non-abrasive solids, thoroughly mixing the ingredients, compacting the mixture to form an article therewith, maturing the article by baking in the temperature range from about 100° C. to about 225° C., thus maturing the resin bond to a thermoset condition.

References Cited in the file of this patent

UNITED STATES PATENTS

| | | |
|---|---|---|
| 2,859,198 | Sears et al. | Nov. 4, 1958 |
| 2,878,111 | Daniels et al. | Mar. 17, 1959 |
| 2,881,064 | Rankin et al. | Apr. 7, 1959 |
| 2,882,505 | Feder | Apr. 14, 1959 |

FOREIGN PATENTS

| | | |
|---|---|---|
| 643,964 | Great Britain | Oct. 4, 1950 |
| 644,337 | Great Britain | Oct. 11, 1950 |